METHOD OF SEARCHING AND READING OUT INFORMATION BEARING CARDS

Filed July 2, 1964

INVENTORS
ROBERT L. RUTLEDGE
RAYMOND W. SHREWSBURY
BY
Carpenter, Abbott, Coulter & Kinney
ATTORNEYS United States Patent Office 3,460,100
Patented Aug. 5, 1969

3,460,100

METHOD OF SEARCHING AND READING OUT INFORMATION BEARING CARDS

Robert L. Rutledge, St. Paul, and Raymond W. Shrewsbury, Roseville, Minn., assignors to Minnesota Mining and Manufacturing Company, St. Paul, Minn., a corporation of Delaware Filed July 2, 1964, Ser. No. 379,886
Int. Cl. G11b *7/08;* G02f *1/28;* G06k *7/14*
U.S. Cl. 340—173 3 Claims

ABSTRACT OF THE DISCLOSURE

Method of searching substantially simultaneously for a plurality of descriptors each having a coordinate location in a light transmissive information storage card by positioning a source of collimated light at a light admitting edge in a coordinate location and a light receiving means at a light emitting edge in the coordinate location, and regulating the light source and receiving means so they are synergetic to identify each descriptor.

Figure 1:
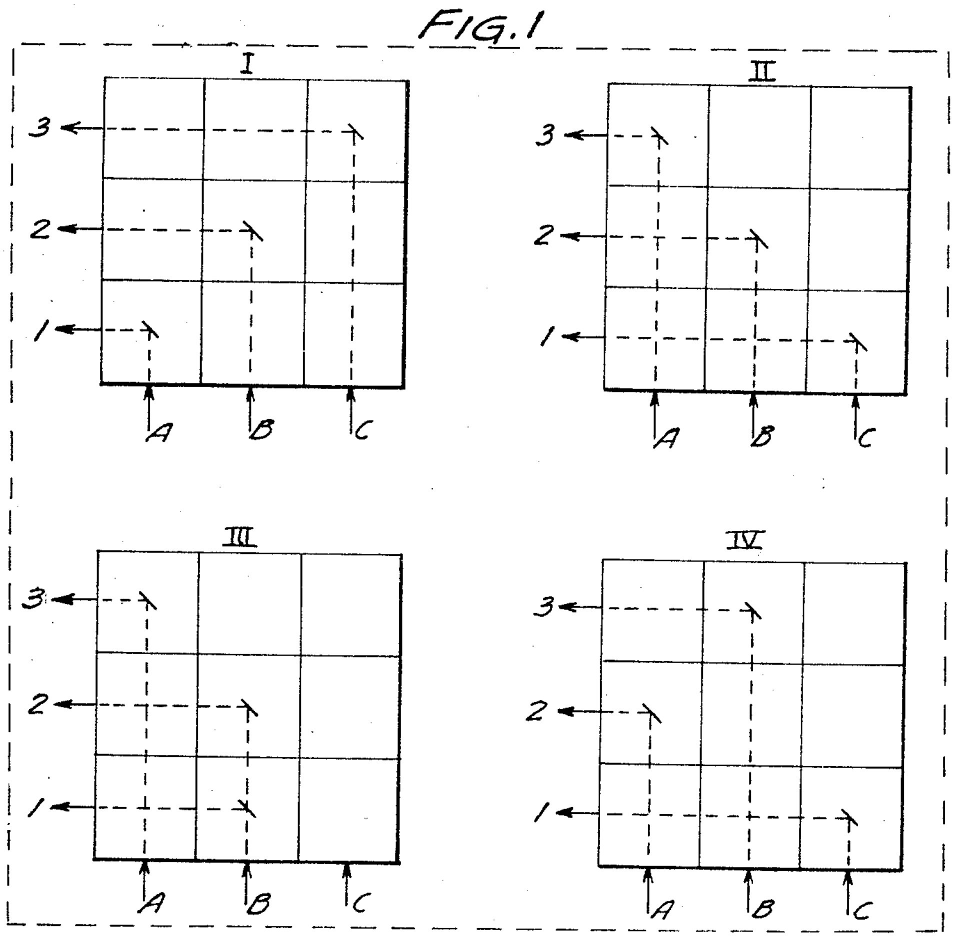

This invention relates to a method for searching an information storage system in which a predetermined group of information designating marks may be simultaneously detected.

Those skilled in the art will appreciate that storage and retrieval systems conventionally include a plurality of discrete card-like information storage elements and that all elements in the system are indexed by some sort of descriptor scheme.

A well-known method of indexing and search is one in which the total information content of the system is described or indexed according to a discrete group of keywords or descriptions constituting a fixed descriptor vocabulary. Any given document to be stored is indexed by selecting pertinent descriptor words from such vocabulary to describe the information content of the given document. In searching such an information file, a search can be directed to any given descriptor or combination of descriptors according to the nature of the information requested. This is known as a coordinate indexing system.

It will be appreciated that there are two possible approaches to searching an information storage file. One is commonly called the serial method in which individual media in the file are examined sequentially. Well-known examples of this method include magnetic recording tape and Hollerith punched cards. The other is commonly called the parallel method in which individual media in the file are examined simultaneously. Well-known examples of this method include edge notched cards such as the so-called McBee "Key Sort" system. The inherent characteristics of a particular information system naturally determine which method is most appropriate for use in a given search situation. Often because of the inherent search times involved, a parallel method is most desirable.

Heretofore, simple implementation for storage and retrieval according to coordinate indexing techniques have been generally ineffective. Costly and complex computer schemes have been devised in efforts to accomplish this very desirable type of search.

There has now been discovered an information storage system, to wit, the information storage and retrieval system described in co-pending application, Ser. No. 379,828, filed July 2, 1964, whereby one can accomplish a parallel search of all elements of such a system.

It will be appreciated that because, in the present invention, individual storage elements are examined edgewise, either serial or parallel search techniques may be applied as desired. It will be further appreciated that in some types of memory devices all of the information required for a given data processing operation may be incorporated into a single coordinate matrix, (i.e. a single element or medium) which is examined only when that particular processing operation is performed. For purposes of the present application, an individual storage medium used in the method of the present invention and described in the aforesaid co-pending application is herein strictly as a matter of convenience for reference purposes termed a "Shrewsbury type" information storage medium. The medium is described in the copending application as a translucent, uniform photon transmissive, sheet-like member having edge portions of a predetermined shape to define light admitting and emitting areas. The material of the medium may be treated to place at least one optical discontinuity therein whereby light entering an edge portion and directed along a path toward an optical discontinuity will be deflected thereby toward and emitted at a prescribed edge portion. The preferred shape of said medium is rectangular or square, transparent, and having opposed parallel faces with edge portions normal to each other.

By the present invention, a method is provided whereby one can use this same new system to simultaneously search a plurality of descriptors stored therein. Thus, while heretofore an element stored in this new information storage and retrieval system described in the indicated co-pending application could be searched only by several complete examinations of the entire system, now, by a single parallel search of the entire system, the necessary plurality of separate descriptors can be simultaneously located.

It is an object of the present invention to provide a simple, effective method for accomplishing substantially simultaneous descriptor searching of a predetermined group of descriptors in a fixed descriptor vocabulary during a search of an information storage and retrieval system.

It is another object to provide a method of the type indicated for use in a parallel search of an information storage and retrieval system.

It is a further object of this invention to provide a method for eliminating or minimizing false drops during retrieval in a search of a plurality of card-like storage media or elements stacked in deck form when two or more separate index terms are simultaneously being searched.

Figure 2:
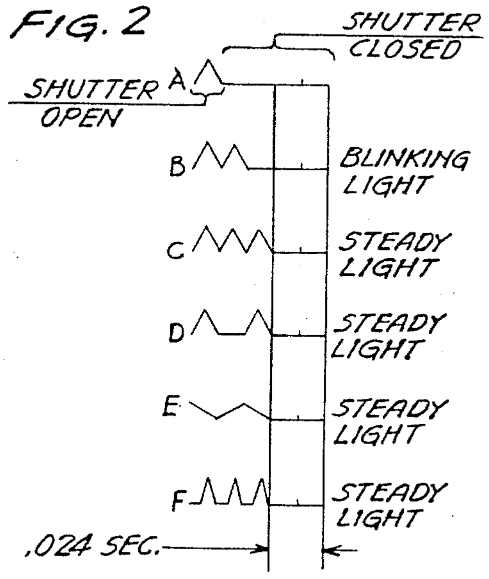

Other and further objects will become apparent to those skilled in the art from a reading of the present specification, taken together with the drawings wherein:

FIGURE 1 is a diagrammatic illustration explaining the possible interference or confusion which can result in searching for index marks in accordance with the teachings given in the aforedescribed co-pending application, Ser. No. 379,828, when one desires to retrieve card-like storage media by means of several marks in a simultaneous search as therein described; and FIGURE 2 shows a plurality of line graphs illustrating the manner of light sequencing in order to achieve fusion as respects the eye of a human observer simultaneously reading out retrieved descriptors.

Referring to FIGURE 1, there is seen a series of four models, identified as I, II, III and IV, respectively, which illustrate simultaneous search of a group of three desired descriptors. These descriptors are to be searched, for illustration purposes by the techniques described in co-pending application Ser. No. 379,828. From these models, it is readily appreciated by those skilled in the art that, in this system, the use of light reflecting optical discontinuities in a transparent card is limited from a descriptor coding standpoint, because with simultaneous specific light inputs and detection of specific light outputs, not only the wanted card, but also a significant number of others (termed "false drops") in a deck of like cards, provide the wanted output light pattern. These false drops result from the fact that one receives the same output signal at a given output detecting position even though the light reflecting optical discontinuities are located in different positions. If, however, in accordance with the present invention, one sequentially illuminates specified input coordinate positions of such cards, while concurrently detecting corresponding output coordinate positions in a like sequence, each descriptor location on a single card becomes unique and separately identifiable.

In a coordinate indexing field consisting of, for example, nine squares as depicted in FIGURE 1, there are 84 possible different combinations, using three marks. If, as in Model I the desired search coordinates are A–1, B–2 and C–3 as illustrated, and the card edge is illuminated at coordinates A, B, and C and is in turn viewed at coordinates 1, 2, and 3, not only will cards containing the wanted code as above in Model I produce the desired output, but cards coded for example in Models II, III and IV will also produce the desired output light combination. A simple mathematical calculation indicates that of 84 possible permutations of nine possible marks taken three at a time, 27 different groupings of markings produce the same wanted output reading.

The explanation for this result can readily be seen by noting that there will be emergent light in row 2 regardless of whether light is admitted at Column A with a mark at A–2, Column B with a mark at B–2 or Column C with a mark at C–2. There is no possible confusion as long as a single mark is searched at any given time. However, if as illustrated above, it is desired to simultaneously search several marks, a human output detector is unable to distinguish a mark at A–2, B–2 or C–2 so that all such marks produce identical output, and cards containing markings not searched are indicated also.

To overcome this problem, one can use a technique whereby individual coordinate locations can be searched individually and in sequence. Thus, in FIGURE 1 and Models I, II, III and IV, one first searches marks only at A–1 as found in Model I. Then from the entire information file, one first separates those cards coded at A–1. Next, from that smaller selection of cards only locations B–2 are searched and located without interference by marks at B–1 or B–3. Thus, a still more restricted group of cards can now be selected. Finally a search is conducted for location C–3 to produce those and only those cards with the desired combination of coding marks. However, when so sequentially conducted, this is a laborious search task and requires three separate retrieval search in order to select the desired cards from even as simple an example as that discussed above. As the coordinate field becomes larger and more descriptors are needed to describe a given search item, the problem obviously becomes even more complex and laborious.

By this invention it has now been found that such substantially simultaneous searches of prechosen descriptors in a fixed descriptor vocabulary stored in one or more light-transmissive information storage cards of the Shrewsbury-type, can be accomplished. The technique involves positioning a source of collimated light along a light admitting edge of such a card at each position therealong corresponding to the coordinate location of a said descriptor with respect to said admitting edge and also positioning a light receiving means along a light emitting edge of the same card at each position therealong corresponding to the coordinate location of a said descriptor with respect to said emitting edge. Usually, though not necessarily, a light admitting edge is positioned about 90° with respect to the light emitting edge.

Each such light source is interrupted (i.e. regulated) in a predetermined manner, and each light receiving means is intermittently operated in a predetermined manner. The interrupting or modulation of each light source and the operating of each light receiving means is sequenced or programmed so that all cooperate together (i.e. in a synergetic manner) during a predetermined cycle of operation to accomplish a search for the prechosen descriptors.

For example, if as in FIGURE 1, the input coordinate locations are each provided with columnated light, and individual shutters therefor, or the like, and the output coordinate locations are each provided with shutters, photocells, or other light receiving means, a card coded A–1, B–2, C–3 (see Model I) may be distinguished positively from any of the other 26 possible combinations in virtually the very short time period required for an individual search, by rapidly, for example, first opening and closing shutters A and 1 simultaneously, then repeating such shuttering operation for locations B and 2, and then finally for C and 3. One sequencing procedure is to open a shutter such as A and then sequentially open and close shutters 1, 2 and 3, respectively. Next shutter B is opened and shutters 1, 2 and 3 are sequentially opened and closed again. Finally, shutter C is opened and the sequential opening process is repeated with shutters 1, 2 and 3. The preferred programming procedure utilizes light control at both the input and the output locations.

No conflicting output is produced since while shutter A is open, only shutter 1 is open and no false indication can be produced in rows 2 or 3. Thus, during a search conducted in such manner for cards coded A–1, B–2, C–3, only cards so coded will show light output in rows 1, 2 and 3. It is seen, for example, that Models II, III, and IV of FIGURE 1, will not and cannot produce an output light in all three rows when searched as just described.

Such a sequencing or programming search method is sufficient when output light is to be detected by some photoelectric or other device subject to quantitative detection both of light level and light pulse duration. However, when the human eye is to be employed as the detector, a further confusion usually arises because of the difficulty or impossibility of differentiating with the eye the exact sequence of short light pulses from among a group of rapidly pulsing pulse groups.

It is a further feature of the present invention that any confusion owing to blinking is eliminated by programing (i.e. sequencing) the rate and timing of light interruption (or modulation) such that only the desired descriptor combination will produce blinking at such a rate as to give the appearance of a steady light output (relative to a human eye) while all interfering combinations will give light output that is obviously interrupted. It is known that lights blinking with certain frequencies and other definable characteristics appear to the eye to represent a continuous light output or fusion as distinguished from lights with different blinking characteristics which will appear intermittent. Hence, when the shutter pulsing frequency is chosen so that the emergent light from Model II appears continuous while that from Model I or III appears to blink, the method of the present invention results. The light sequencing conditions necessary to obtain fusion under various conditions so as to make the sequencing method operable have been developed, as a further part of the present invention. Surprisingly, it has been discovered that the primary condition affecting fusion frequency is the length of the longest dark period in any sequence of light flashes and that the total duration or arrangement of light pulses (i.e. light plus dark interval) is relatively unimportant for purposes of this invention.

In FIGURE 2 are shown a series of line graphs indicative of various sequences for light beams sequentially shuttered into a medium such as shown in FIGURE 1. The pips or light flashes in the various line graphs are not necessarily indicative of the light pattern passing through a shutter. Rather, they represent a time basis, open vs. closed shutter, with the total length being equal to one cycle.

The graphs indicate that the length of the longest time the light pulse is off per cycle, and not the total time the light is on, surprisingly and unexpectedly constitutes the controlling or dominant factor. To determine the significance of this factor the cycle is modified to vary the light pulse sequence and duration for each cycle. The individual line graphs representing these various pulse sequences have a time scale of 0.012 sec. per scale unit.

In Example A, the light is "on" for 0.012 sec. and "off" for 0.048 sec. and the impression of a blinking light is perceived by the eye. In Example B, two 0.012 sec. light pulses are followed by an "off" period of 0.036 sec. and the impression is still of a blinking light. Example C, shows three 0.012 sec. light pulses followed by an 0.024 sec. "off" period and here the light pulses have "fused" into the impression of a steady light. Surprisingly, Example D, which has a total "off" time of 0.036 sec. as in Example B, but a shorter longest individual off period of 0.024 sec., appears as a steady light. Hence, the unpredictable conclusion results that if the longest individual "off" period does not exceed about 0.025 sec., image fusion takes place to give the impression of a steady light to the human eye regardless of the total amount or number of times during the cycle that a light is "off." Examples E and F further illustrate this fact.

One apparatus suitable for use in practicing the method of this invention is described in the Shrewsbury patent application Ser. No. 379,890, filed July 2, 1964, now Patent No. 3,272,205.

When one substantially simultaneously electro-optically searches for two or more descriptors in a fixed descriptor vocabulary to detect light output from a Shrewsbury-type information storage medium, the procedure, as those skilled in the art will readily appreciate, involves generally the generation of a pulsed electrical signal which contains the exact sequence and duration necessary for fusion to occur. In other words, one sequences or programs the input light according to a prechosen sequence and duration. Then one quantitatively detects by electro-optical means the character of any output light issuing from selected locations on a medium edge. Since the human eye is incapable of distinguishing the exact sequence and duration of short pulses (light) when one visually detects light output, it is necessary to resort to or take advantage of the aforedescribed light pulse cycle.

Having described our invention, we claim:

1. A method for substantially simultaneously searching for a plurality of descriptors each having a coordinate location in a light-transmissive information storage card having light admitting and light emitting edge portions, said method comprising the steps of:

positioning a source of collimated light along a light admitting edge of a said card at each position therealong corresponding to the coordinate location of a said descriptor with respect to said admitting edge;

positioning a light receiving means along a light emitting edge of the same card at each position therealong corresponding to the coordinate location of a said descriptor with respect to said emitting edge;

regulating each said light source in a predetermined manner;

operating intermittently each said light receiving means in a predetermined manner; and programming the regulation of each said light source with the operation of each said light receiving means such that for a given descriptor the light source and the light receiving means defining the coordinate location of said given descriptor are synergetic to identify the presence of each descriptor.

2. A method for substantially simultaneously searching for a plurality of descriptors each having a coordinate location in a light-transmissive information storage card having light admitting and light emitting edge portions, said method comprising the steps of:

positioning a source of collimated light along a light admitting edge of a said card at each position therealong corresponding to the coordinate location of a said descriptor with respect to said admitting edge;

positioning a light receiving means along a light emitting edge of the same card at each position therealong corresponding to the coordinate location of a said descriptor with respect to said emitting edge;

interrupting each said light source in a predetermined manner;

operating intermittently each said light receiving means in a predetermined manner; and programming the interruption of the light source and the operation of the light receiving means defining the location of a desired descriptor with the interruption of a light source and the operation of a light receiving means defining the location of another desired description at a predetermined time interval to give the effect of steady light output from a card at the coordinate locations along the emitting edge thereof corresponding to the location of both desired descriptors.

3. The method as descriped in claim 1 wherein, the interval between the operation of each light source and each cooperating light receiving means is such that the light from such light source is not interrupted for a time interval greater than about 0.025 second.

References Cited

UNITED STATES PATENTS 3,169,190 2/1965 Ress ---------------- 340—173

TERRELL W. FEARS, Primary Examiner

U.S. Cl. X.R.

235—61; 350—160